United States Patent [19]

Vetter

[11] 4,078,815
[45] Mar. 14, 1978

[54] SIDECAR FRAME

[75] Inventor: Craig W. Vetter, Rantoul, Ill.

[73] Assignee: Vetter Design Works, Inc., Rantoul, Ill.

[21] Appl. No.: 723,268

[22] Filed: Sep. 14, 1976

Related U.S. Application Data

[63] Continuation of Ser. No. 499,969, Aug. 22, 1974, abandoned.

[51] Int. Cl.² .......................................... B62K 27/12
[52] U.S. Cl. .................................................. 280/203
[58] Field of Search ........................ 280/203, 293, 284

[56] References Cited

U.S. PATENT DOCUMENTS

| 1,125,743 | 1/1915 | Scott | 280/203 |
|---|---|---|---|
| 1,133,444 | 3/1915 | Messier et al. | 280/203 |
| 1,236,988 | 8/1917 | Scott | 280/203 |
| 1,417,822 | 5/1922 | Grew | 280/203 |
| 2,797,933 | 7/1957 | Aldous | 280/203 |
| 3,788,670 | 1/1974 | Petersen | 280/203 |

FOREIGN PATENT DOCUMENTS

| 514,264 | 4/1920 | France | 280/203 |
|---|---|---|---|
| 181,541 | 4/1921 | United Kingdom | 280/203 |
| 827,607 | 4/1957 | United Kingdom | 280/203 |

*Primary Examiner*—Kenneth H. Betts
*Attorney, Agent, or Firm*—Wegner, Stellman, McCord, Wiles & Wood

[57] ABSTRACT

A motorcycle sidecar frame composed of five elongate struts secured together at their respective ends into a shape substantially conforming to that of a tetrahedron. In one embodiment, a portion of an elongate frame member found on a motorcycle comprises the sixth edge of the tetrahedron. Two of the vertices of the tetrahedral frame are respectively located at two spaced points of the frame member. The remaining two vertices of the tetrahedron are respectively secured to a sidecar suspension system. One of the vertices is secured to the top of a shock absorber, which extends downwardly to the axle of the sidecar wheel, and the other vertex is pivotally secured to the end of an arm, the other end of which is secured to the sidecar wheel axle. In an alternative embodiment of the basic tetrahedral frame, the function of the five elongate struts of the first embodiment and the sixth strut is provided by the edges or corners of a tetrahedron formed by suitable sheets of metal. Other embodiments include frame members additional to the tetrahedral struts to strengthen the basic frame, to more securely locate the frame relative to the motorcycle and to facilitate the mounting of a sidecar body. The tetrahedral frame is releasably attached to the motorcycle by clevis and pin-type connectors which are suitable for connection to motorcycle frames of different dimensions, and include, or cooperate with, means for adjusting sidecar wheel toe-in.

14 Claims, 15 Drawing Figures

SIDECAR FRAME

This is a continuation of application Ser. No. 499,969 filed Aug. 22, 1974, now abandoned.

BACKGROUND OF THE INVENTION

With the recent advent of increased popularity of motorcycles, both as sports vehicles and vehicles for basic transportation, an interest in motorcycle sidecars has been renewed. The substantial increase in passenger and loadcarrying capacity provided by connecting a sidecar to a motorcycle enhances the utility of the motorcycle and adds an element of stability, the lack of which might otherwise discourage would-be users or purchasers of motorcycles. Further, if a sidecar is readily detachable and attachable to the motorcycle, the aforementioned advantages of a sidecar can be enjoyed while still permitting use of the motorcycle separate from the sidecar with the attendant improvement in maneuverability and handling on occasions when the advantages provided by a sidecar are not needed.

The fundamental elements of a typical sidecar comprise a frame, means for securing the frame to a motorcycle, a body supported by the sidecar frame and a sidecar wheel and associated axle attached to the frame on the side opposite the motorcycle. A suspension system for absorbing road shock may also be considered a fundamental element.

Preferably, a sidecar frame should be lightweight and readily connectible with the motorcycle, while having the necessary strength and rigidity characteristics needed to withstand the various loads and stresses which may be applied to it during normal usage. It is further desirable that the frame be adaptable for mounting to different makes of motorcycles and that it facilitates use of an easy and simple means to absorb road shock. Needless to say, the fewer the number of frame elements and the lesser the amount of material needed for each frame element, the less expensive will be the manufacturing costs of the frame.

Known sidecar frames have substantially failed to achieve many, if not all, of the objectives noted above. Specifically, such sidecar frames have included a large number of frame elements and used elements of large size and strength. This has added to the weight of such frames, detracted from the ease of interconnection of the frame and motorcycle and otherwise presented ancillary disadvantages.

SUMMARY OF THE INVENTION

The foregoing disadvantages of known sidecar frames are substantially overcome in a unique manner in the sidecar frame of the present invention by constructing that frame in a form that substantially conforms to the shape of a tetrahedron. A tetrahedron is the term applied to the species of a polyhedron which has only four faces. The four faces, each of triangular shape, are defined by six straight lines extending between four three-dimensionally spaced points or vertices. In the preferred embodiments of the sidecar frame of the present invention, two of the vertices are connected to a suspension system located at the side of the frame adjacent the sidecar wheel opposite the motorcycle, and two of the vertices are located at two connection points on the motorcycle and extending therebetween are at least five elongate struts defining five of the six edges of the tetrahedron. The sixth edge of the tetrahedron, when not provided by the sidecar frame, may be provided by a motorcycle frame member found on most, if not all, motorcycles, when the sidecar frame is mounted to the motorcycle.

The unique provision of a tetrahedron-shaped frame for a motorcycle sidecar results in numerous advantages over prior sidecar frame structures. The tetrahedral frame is unique relative to known sidecar frames in that it may be characterized as a perfect space frame, i.e., a structure built up of a number of small, straight struts which is equally strong when its joints are connected by pins as when rigidly connected by weld joints or the like. Thus, the frame is well suited for detachable connection to a motorcycle by means of a clevis and pin connections or the like, and this type of connection can be utilized without detracting from the strength or rigidity of the frame. Further, if all the joints are pinned together and provided with struts adjustable in length, the frame can be varied to fit virtually any motorcycle regardless of its dimensions. Still a further feature of the tetrahedral frame of the present invention is that, because of its inherent strength and rigidity, the number of struts and the size, strength, and weight of each strut is less than that of known frames of comparable frame strength.

In accordance with the present invention, an additional strut may be provided extending between one of the vertices adjacent the sidecar wheel and a third point on the motorcycle frame which is not a vertex of the tetrahedral frame. However, the basic tetrahedral frame carries all of the sidecar forces, and this additional strut is provided merely to firmly locate the position of the tetrahedron relative to the motorcycle and to facilitate securement of and support of the sidecar coach or body. Depending upon the shape and size of the sidecar coach, whether it be designed for carrying passengers or other loads, still further sidecar frame members may be added to facilitate the mounting and support of the coach body.

A further feature of the present invention is presented in an alternate embodiment of the sidecar frame, in which the edges of an enclosed tetrahedron formed from conventional sheet plastic, sheet metal, or other suitable sheet material, serve the function of the elongate struts of the described above embodiment. All six edges of the tetrahedron, rather than just five, are of course provided by the frame in this alternate embodiment of the tetrahedral frame. A particular advantage of the alternate embodiment is that the frame may additionally serve as an auxiliary gas tank or other storage space. In the first embodiment, the area within the tetrahedron defined by the struts is usable to locate a separate auxiliary gas tank which is nonintegral with the frame.

A simple suspension system for the tetrahedral sidecar frame is provided comprising a swing arm and shock absorber. The swing arm is pivotally connected at one end to a vertex of the tetrahedral frame and secured at its other end to a sidecar wheel axle bearing. One end of the shock absorber is also secured to the wheel axle bearing and the other end is secured to another vertex of the tetrahedral frame located above the first vertex to which the swing arm is connected.

BRIEF DESCRIPTION OF THE DRAWINGS

The foregoing features and advantages will be described, and further features and advantages will be made more apparent from the following description of the preferred embodiment taken in conjunction with the following drawings, in which.

DESCRIPTION OF PREFERRED EMBODIMENT

The sidecar frame of the present invention may be usefully employed in conjunction with almost any type of vehicle to which it is desired to attach at its side a car to be carried by the vehicle. However, such sidecars are most frequently used in conjunction with motorized bicycles or motorcycles, and the sidecar frame of the present invention, while not limited to use with a motorcycle, is primarily intended for such use. With this understanding, the sidecar frame will be referred to as a motorcycle sidecar frame, and its particular use in conjunction with a motorcycle will be described.

Thus, a preferred embodiment of the basic sidecar frame of the present invention, generally designated by reference numeral 30, is shown in the drawings attached to a motorcycle of common configuration, generally designated by reference numeral 32. The sidecar, in addition to frame 30, includes suitable means for attaching the sidecar frame 30 to the motorcycle 32 which will be referred to as mounting bracket assemblies generally designated by reference numeral 34, a suspension system, generally designated by reference numeral 36, a wheel assembly generally designated by reference numeral 38, and a sidecar body or coach, generally designated by reference numeral 40. The particular coach 40 depicted in the drawing is particularly adapted for carrying passengers, but coaches of other designs for other loadcarrying purposes could of course be utilized in conjunction with the frame. Likewise, other types of suspension systems and mounting bracket assemblies could of course be used with the basic sidecar frame 30.

Figure 1:
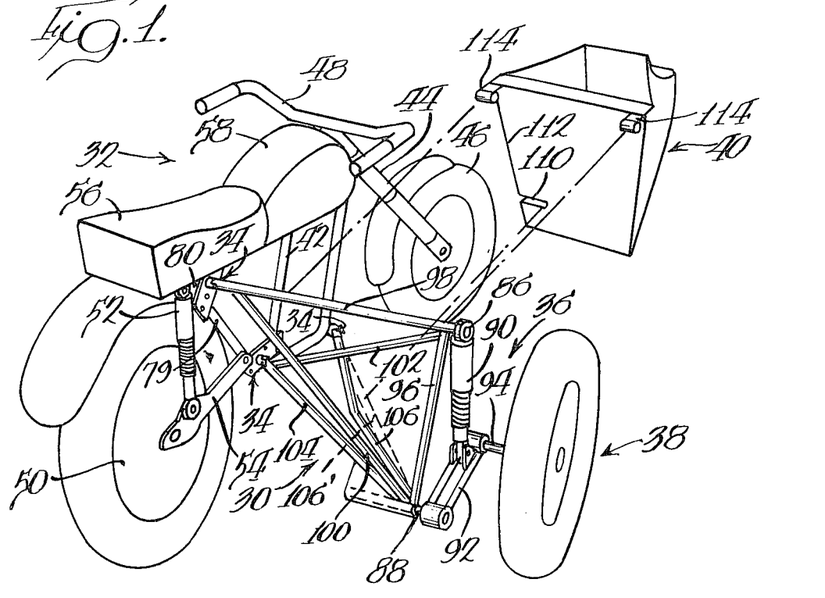
FIG. 1 is a perspective view of a preferred embodiment of the sidecar frame of the present invention attached to a motorcycle with an exploded view of a sidecar coach which may be secured to the frame.
Figure 2:
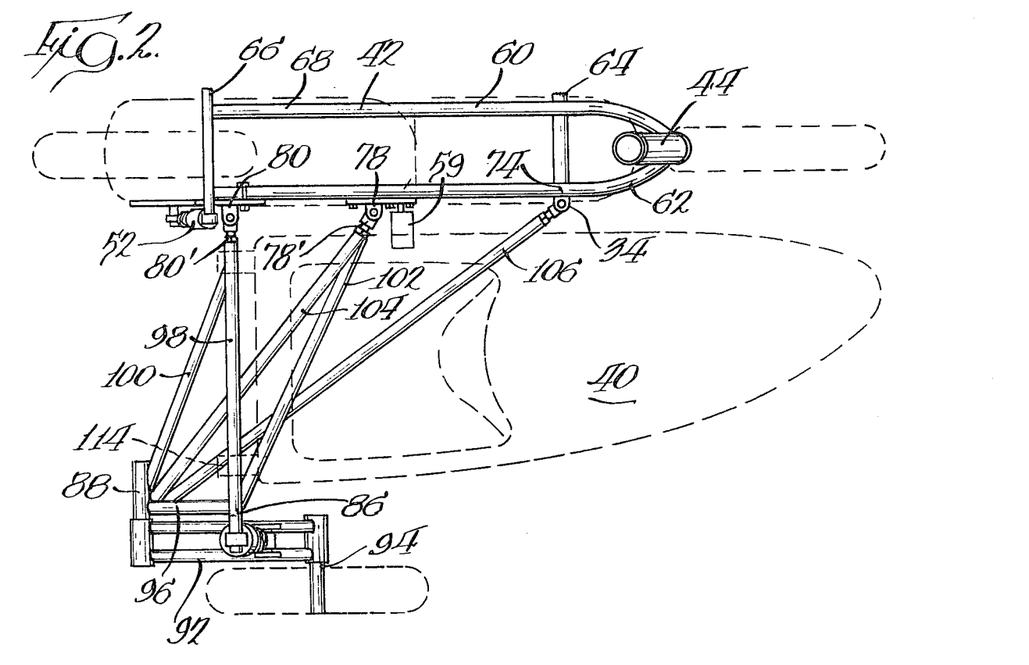
FIG. 2 is a top view of the sidecar frame and motorcycle shown in FIG. 1 with a sidecar coach depicted with broken lines illustrating its position relative to the frame when mounted.

Referring to the drawings, particularly FIGS. 1-4, the motorcycle 32 has a frame 42 to which is secured a steering column bearing assembly 44. Assembly 44 carries a steering column attached at a forked end thereof to the axle of a front wheel 46 and connected at its other end to handle bar 48. The axle of a rear wheel 50 is secured to motorcycle frame 42 by means of a suitable suspension system including a shock absorber 52. One end of shock absorber 52 is secured to the frame adjacent a point 80 thereof near the top of the motorcycle and its other end is secured to a swing arm 54. Swing arm 54, in turn, is secured at its end adjacent the connection to shock absorber 52 to the axle of wheel 50 and pivotally secured at its other end to another point 78 on the frame located downwardly and forwardly with respect to point 80. Additionally, the motorcycle 32 includes a seat cushion 56 and a gas tank 58 mounted atop the frame 42. Although not shown in the drawings for purposes of facilitating illustration of the present invention, the motorcycle 32 is of course also provided with an engine, generally mounted to the frame beneath the gas tank 58, a suitable drive linkage from the engine to the rear wheel 50, a braking mechanism and other associated mechanisms needed to control the motorcycle. Finally, with regard to the motorcycle parts attached to the frame as illustrated in FIG. 2, foot pedals 59 are generally provided on opposite sides of the motorcycle, the right side one of which being shown in FIG. 2.

Figure 3:
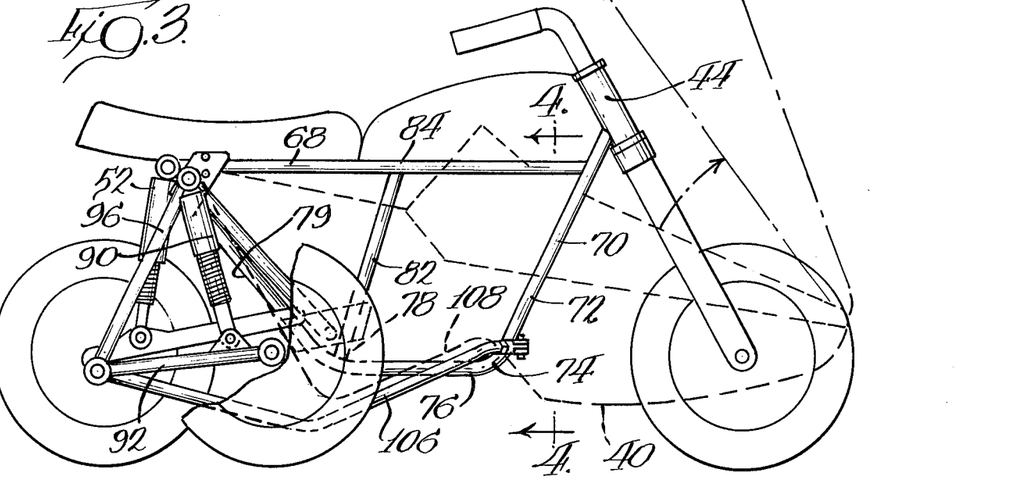
FIG. 3 is a side view of the motorcycle and sidecar frame of FIG. 1 also illustrating the relative position of the sidecar coach when secured to the frame.
Figure 4:
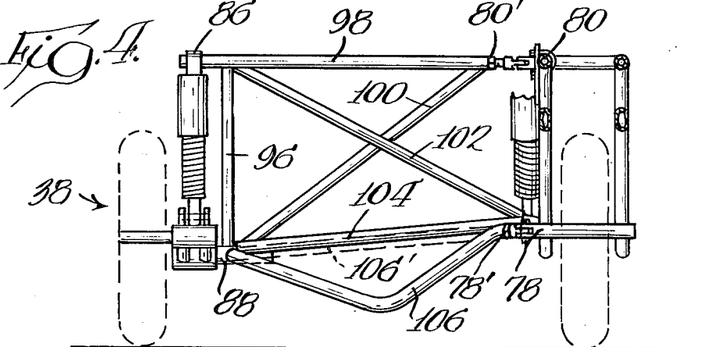
FIG. 4 is an illustration of the preferred embodiment of the sidecar frame shown in the previous drawings as seen from view position line 4—4 of FIG. 3 at the front of the frame.

More specifically with regard to the motorcycle frame 42, the frame elements are generally formed from suitable cylindrical metal stock, which may be tubular, that is bent, cut and then welded as needed to form the frame as depicted in the drawings. As best seen in FIG. 2, the frame includes a left-hand section 60 and a right-hand section 62 which is a mirror image of section 60. Sections 60 and 62 are joined together at the steering column bearing assembly 44 and may also be secured together by a suitable cross member 64 adjacent the front of the frame and another cross member 66 at the back of the frame. Each of the sections includes a substantially straight, elongate upper frame member 68 extending from the steering column bearing assembly 44 to the cross member 66 located above and slightly forward of the rear wheel axle. Upper frame members 68 are located immediately beneath the seat cushion 56 and gas tank 58. Each of the frame sections also includes a lower frame member 70, as best seen in FIG. 3, which has a first portion 72 extending downwardly and rearwardly from adjacent the steering column bearing assembly 44 to a point 74 substantially in alignment with or slightly below a line extending between the motorcycle wheel axles, and a substantially horizontal portion 76 extending from point 74 to another point 78. A third portion 79 of lower frame member 70 extends from point 78 upwardly and rearwardly to a point 80 adjacent cross member 66 located above wheel 50. Preferably, all of the three portions of lower frame member 70 are integrally formed by bending a single piece of tubular stock. An additional frame member 82 extending from and secured to frame member 70 at point 78 to an intermediate point 84 of upper frame member 68 substantially defines a triangle with apexes at points 78, 80 and 84. The members of the frame not integrally formed are preferably secured together by weld joints or the like.

While the frame depicted in the drawings and described above is a type commonly found in motorcycles of many manufacturers, and for this reason the sidecar frame of the present invention will be described in connection with this type of frame, it should be appreciated that the sidecar frame of the present invention is suitable and adaptable for connection with motorcycle frames of other designs and, in fact, even with other types of vehicles.

Regardless of the exact design of the motorcycle frame, there are found on virtually all motorcycles three points on the frame of substantially more than adequate strength necessary for attachment to a sidecar, at relative locations corresponding to points 78, 80 and 74 of frame 42. These points on the frame, because of their strength, are ideal points for connection with the sidecar frame, and for this reason the sidecar frame of the present invention is particularly adapted for connection to a motorcycle frame at points having these relative locations.

With continuing reference to FIGS. 1-4, a preferred embodiment of the basic sidecar frame 30 of the present invention is seen to comprise five elongate struts 96, 98, 100, 102 and 104 connected together into a shape substantially conforming to that of a tetrahedron. The four points at which the ends of the struts are joined together define the vertices of the tetrahedron, and each of the struts define five of the six edges of the tetrahedron. A first pair of vertices 78' and 80' correspond to the ends of the struts adapted to be attached to the motorcycle frame 42 at points 78 and 80, and a second pair of vertices 86 and 88 are adapted to be the sidecar suspension system 36.

Suspension system 36 includes a vertically disposed shock absorber 90 of the dashpot type secured at one end to the juncture of three struts forming vertex 86 and secured at its other end to the fixed end of a swing arm 92 adjacent the axle 94 of wheel assembly 38. Swing arm 92 is pivotally mounted at its other end to a pivot axis provided adjacent vertex 88. This pivotal connection, of course, permits upward forces applied to wheel 38 by road shock to be transmitted into upward motion of the piston of shock absorber 90 and thereby absorbed.

The ends of three struts are secured together to form each of the vertices 86 and 88 and one strut from each of vertices 86 and 88 are joined together at their opposite ends to form the vertex 80' of the tetrahedral frame adapted to be attached to motorcycle frame at point 80 and another one of the struts from each of vertices 86 and 88 are joined together at their opposite ends to form the other vertex 78' of the tetrahedron adapted to be secured to the motorcycle frame at point 78. A strut extending between vertices 86 and 88 completes the three-strut juncture forming vertices 86 and 88. More specifically, a first strut 96 extends between vertices 86 and 88; a second strut 98 extends between vertices 86 and 80; a third strut 100 extends between vertices 88 and 80; a fourth strut 102 extends between vertices 86 and 80'; and a fifth strut 104 extends between vertices 88 and 78'.

As noted above, because of the tetrahedral shape of frame 30, it is equally strong whether the ends of the struts were welded together or merely secured together by means of pins. In the preferred embodiment shown in FIGS. 1-4, the ends of the struts are secured together by means of weld joints.

When the sidecar frame 30 is attached to the motorcycle, as shown in FIG. 1, the elongate portion 79 of the motorcycle frame 42 extending between points 78 and 80 thereof, of course, functions as, and thereby forms or corresponds to, the sixth edge of the tetrahedron, the other five edges of which are provided by struts 96, 98, 100, 102 and 104. The vertices formed by struts 98 and 100 and struts 102 and 104 are respectively secured to points 80 and 78 of motorcycle frame 42 by means of pin connections of suitable bracket assemblies 34 to facilitate connection and disconnection between the motorcycle and the sidecar frame, as will be explained in more detail hereinafter.

The five struts, 96, 98, 100, 102 and 104, form the basic tetrahedral frame for the motorcycle sidecar of the present invention and are sufficient, in and of themselves, to carry and withstand all the various loads and stresses applied to the frame. However, to facilitate securement and support of the motorcycle coach 40 to the frame 30, and to more rigidly fix the position of the basic frame relative to the motorcycle, an additional elongate frame member 106 extending between vertex 88 and point 74 on the motorcycle frame 42 may be provided. Preferably, one end of strut 106 is secured to the end of struts 100 and 104 at vertex 88 by means of a weld joint, and is secured to point 74 on motorcycle frame 42 by means of a pin connection of the mounting bracket assembly 34 thereat. Strut 106 extends diagonally underneath the sidecar coach 40 and a bottom surface 108 of the sidecar coach 40 rests upon and is supported in part by strut 106. It is desirable to keep the center of gravity of the sidecar coach 40 as low as possible to improve stability. Consequently, strut 106 may be bent downwardly intermediate its ends to permit mounting the sidecar coach 40 closer to the ground than would be permitted if strut 106 were straight, as best seen in FIG. 3. Alternately, to lower the center of gravity, a straight elongate strut 106', indicated in broken lines in FIGS. 4 and 1, may be employed, with the lowering of the center of gravity of the sidecar coach being provided by means of a slot 110 extending diagonally across the rear left-hand corner 112 of the sidecar coach 40 adapted to receive therewithin strut 106' when the coach 40 is mounted to the frame. It is contemplated that both the provision of a slot and a downward bend in strut 106 may be employed together to lower the center of gravity even further if desired. In addition to strut 106 or strut 106', the coach 40 is secured to the sidecar frame 30 by means of mounting members 114 secured to the top edge of the back wall of sidecar coach 40. Mounting members 114, in turn, are adapted to be fastened to the substantially horizontal tetrahedral frame strut 98 extending between vertices 80' and 86, as best seen in FIGS. 1 and 2.

Figure 6:
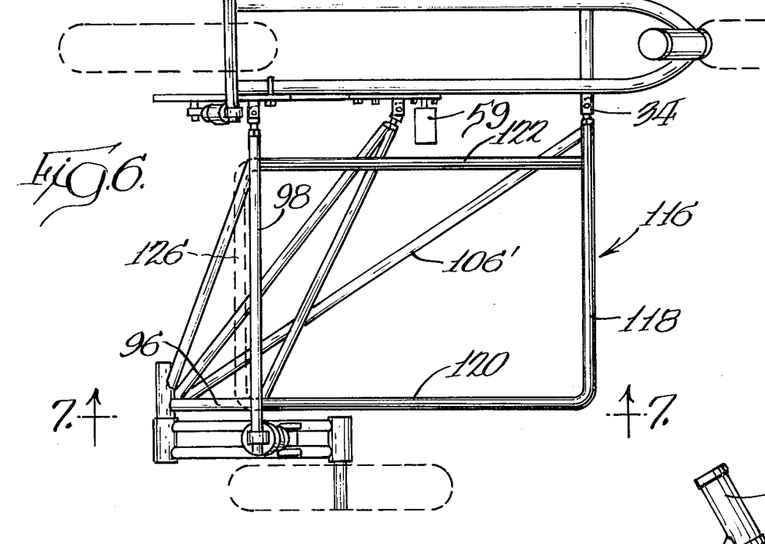
FIG. 6 is a top view of another embodiment of the sidecar frame of the present invention attached to a motorcycle with sidecar frame members additional to those of the embodiment shown in FIGS. 1-5, indicated by shading, which may be added to facilitate the mounting and securement of a sidecar coach.
Figures 7, 8, 9, 10:
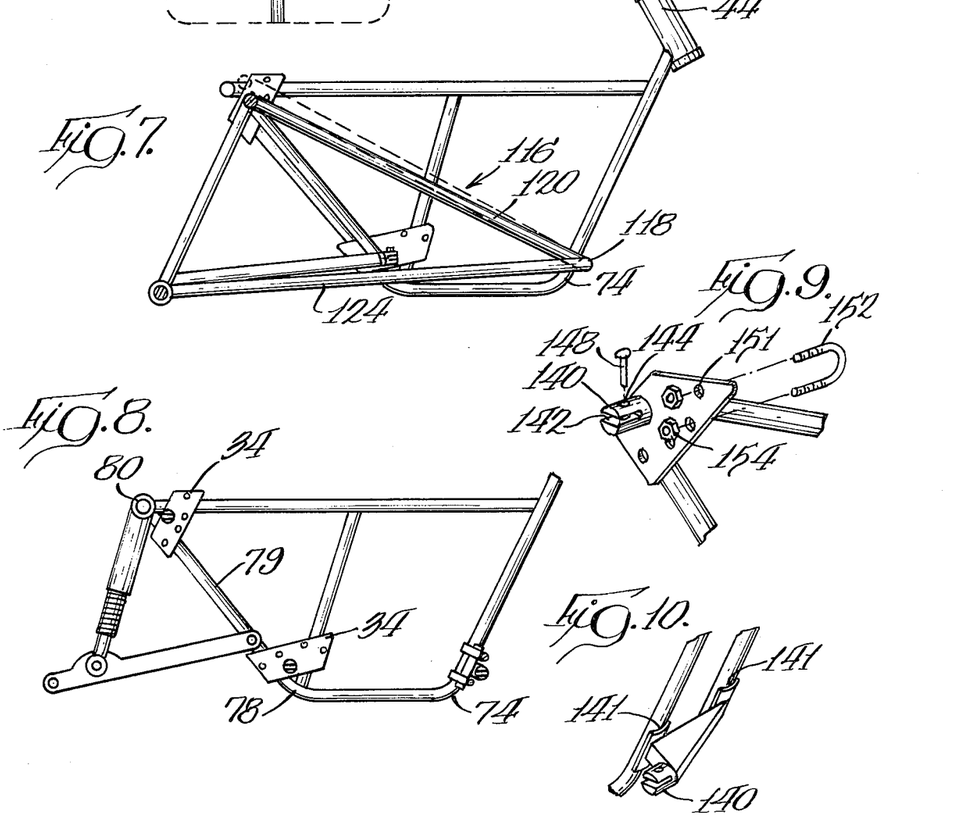
FIG. 7 is a view of the embodiment of the sidecar frame shown in FIG. 6 taken along section line 7—7 of FIG. 6, further illustrating the location of the additional frame members.
FIG. 8 is a side view of a typical motorcycle frame illustrating the relative location thereon of the mounting bracket assemblies of the present invention used to secure the sidecar frame to the motorcycle frame.
FIG. 9 is a partially exploded detailed perspective view of one of the mounting brackets shown in FIG. 8.
FIG. 10 is a detailed perspective view of another one of the mounting brackets shown in FIG. 8.

Sidecar frame members additional to strut 106 or 106', may be provided to further facilitate the mounting and securement of the sidecar coach 40 to sidecar frame 30. Referring to FIGS. 6 and 7, another embodiment of the sidecar frame is shown with additional frame members being shaded to distinguish them from the struts of the basic tetrahedral frame 30. Specifically, the additional frame structure, generally designated by reference numeral 116, is seen to comprise four frame members, 118, 120, 122 and 124 selectively secured together at their respective ends and to the basic tetrahedral frame struts.

The additional frame structure 116 has members 112 and 120 which extend along the sides of sidecar coach 40 and member 118 which underlies and supports the forward portion of the coach bottom.

The three members 118, 120 and 122 in combination with strut 98 preferably form a rectangle, the plane of which slopes downwardly from strut 98 in the forward direction toward point 74 on the motorcycle frame 42. More specifically, a first one of the frame members, frame member 122, is secured at one end to strut 98 adjacent vertex 80' and secured at its other end to the end of a third one of the frame members of structure 116, adapted to be connected to the motorcycle frame adjacent point 74. Likewise, a second one of the frame members, frame member 120, is secured at one of its ends to strut 98 adjacent vertex 86 and secured at its other end to strut 118 at the end of strut 118 opposite the juncture with frame member 122. A third one of the frame members, frame member 118, is secured at its end adjacent the juncture with frame member 122 to the frame of the motorcycle at point 74 by means of a suitable mounting bracket assembly 34. Strut 106' or 106, if used in conjunction with additional frame members 116, may be secured to the end of frame member 116 adjacent the mounting bracket assembly 34 or alternately may be secured to the frame of the motorcycle by means of a separate connection with a mounting bracket assembly 34 at point 74.

A fourth frame member of the additional frame structure 116, frame member 124, is secured at one end to the ends of the basic tetrahedral struts forming vertex 88 and is secured at its other end to the juncture of the third and second frame members 118 and 120. As best seen in FIG. 7, the fourth frame member 124, the second frame member 120 and strut 96 form a triangle lying in a plane which is preferably transverse to strut 98.

Each of the frame members comprising frame structure 116 may be individual lengths of tubular stock that are welded together at their respective ends into the configuration of the frame structure. However, some of the frame members, such as frame members 116 and 120, may be integrally formed by simply bending a suitable length of stock into the desired configuration. Along these same lines, in fact, each of frame members 116, 120 and 122 may be integrally formed by making suitable bends in a single length of tubing having a portion comprising a fifth frame member 126 interconnecting members 120 and 122, as indicated in broken lines in FIGS. 6 and 7. In addition to permitting integral formation of the other frame members, frame member 126 runs parallel to and reinforces strut 98.

Figure 13:
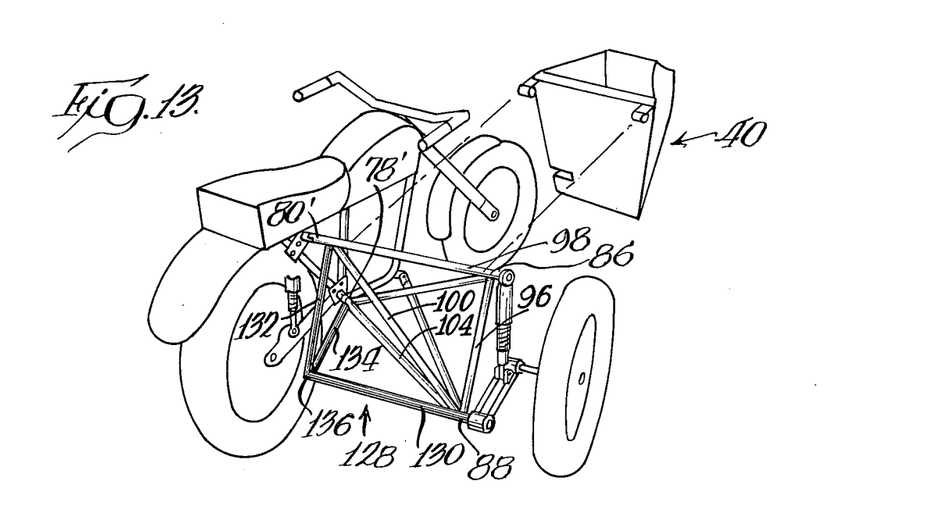
FIG. 13 is a perspective view of another embodiment of the sidecar frame of the present invention secured to a motorcycle with sidecar frame members additional to those of the embodiment shown in FIGS. 1-5, indicated by shading, which may be added to provide reinforcement to the basic frame.
Figure 14:
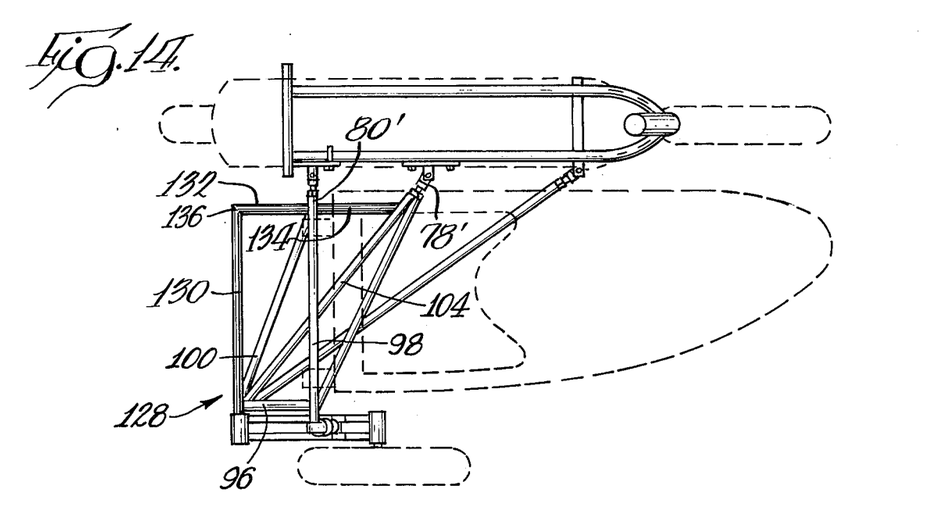
FIG. 14 is a top view of the sidecar frame and motorcycle shown in FIG. 13.

As shown in FIGS. 13 and 14, the sidecar frame of the present invention may include, in addition to the basic tetrahedral frame 30, an additional frame structure, generally designated by reference numeral 128. The struts of structure 128 are shaded to distinguish them from the struts of the basic tetrahedral. Frame structure 128 is primarily provided to strengthen and reinforce the basic frame, but it also facilitates support and mounting of the sidecar coach. Thus, frames of varied strength and varied applications may be constructed in modular form, with the primary load-carrying capabilities being provided by the basic tetrahedral frame 30, and frames of greater strength being constructed by simply adding additional struts to the existing basic frame. The basic tetrahedral frame facilitates such adaptation and is versatility and utility is thereby enhanced.

The preferred embodiment of the reinforcing frame structure 128 comprises three elongate frame members 130, 132 and 134. One end of each of these frame members are joined together at a juncture 136 by means of weld joints or by a weld joint securing the end of one of the frame members to a bend at juncture 136 in a single length of tubular stock forming the other two of the three members. The other end of a first one of the frame members, frame members 130, is secured to the juncture of the struts of the basic tetrahedral frame forming vertex 88. The other end of a second one of the frame members, frame member 132, is secured to the juncture of struts of the basic tetrahedral frame forming vertex 80' adapted to be connected to point 80 on the motorcycle frame 42, and the other end of the third frame member 134 is connected to the juncture of the struts of the basic tetrahedral frame forming vertex 78'. Preferably, frame members 130 and 132 form a rectangle with struts 96 and 98, frame member 130 being parallel to strut 98 and frame member 132 being parallel to strut 96. Frame members 130 and 134 form a right triangle with strut 104. Frame members 130, 132 and 134 and struts 100 and 104 define five edges of a second tetrahedron having two edges shared with the basic tetrahedral frame 30.

Figure 11:
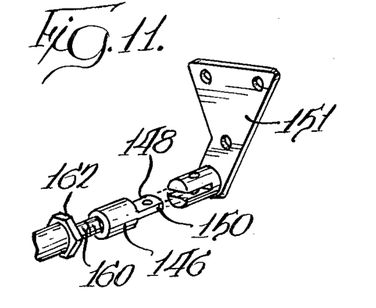
FIG. 11 is a perspective view of another mounting bracket and associated male connector of the mounting bracket assembly, a portion of which is threaded to permit toe-in adjustment of the sidecar wheel.
Figure 12:
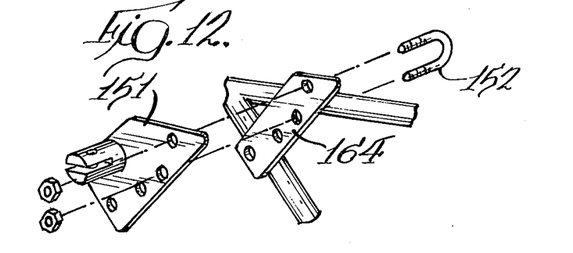
FIG. 12 is an exploded view of the mounting bracket of the type shown in FIG. 9 with the addition of a shim plate illustrating another manner in which toe-in adjustment may be made.

A preferred means of securing the sidecar frame to the motorcycle frame is provided by mounting bracket assembly 34, different versions of which are shown in FIGS. 8, 9, 10, 11 and 12. Each of the mounting bracket assemblies 34 includes a clevis 140 which may be in the form of a cylindrical member having a slot 142 at one end with aligned holes 144 extending through the two portions of the cylindrical member separated by the slot and means for securing the clevis 140 to the motorcycle frame. Assembly 34 also includes a male connector 146 to be secured to the ends of the struts or frame members, as shown in FIG. 11, having an ear 148 with a hole extending therethrough adapted to be received within slot 142 with hole 150 in alignment with holes 144. When male connector 146 is matingly engaged with clevis 140, a suitable pin member 148 extending through each of the holes 144 and 150 pivotally secures together the clevis and the male connector. Pin 148 may comprise a cotter pin, a headed bolt or any other like device of suitable strength and appropriate dimension. Clevis 140 may be secured to the frame by means of a plate 151 secured to the clevis 140 and which, in turn, may be secured to the frame members by means of U-bolt 152 and nuts 154, as illustrated in FIGS. 9 and 12. The plate 151 may be integrally formed with clevis 140, or they may be welded together. This type of detachable connection has been found to be quite suitable for connection at points 78 and 80 of the motorcycle frame. Alternately, the clevis 140 may be more permanently secured to the frame by means of weld joints such as at 141 shown in FIG. 10. This alternate type of connection is necessary at point 74 on same motorcycle frames due to the shape of the frame 42.

A male connector 146 is provided at the juncture of the struts forming the vertex desired to be connected to the motorcycle frame at each of points 78 and 80. Preferably, male connector 146 is secured to the end of one of the struts of the juncture by being directly welded thereto and secured to the ends of the other struts of the vertex through the weld joints at the ends of the other struts to the end of the one strut to which the male connector 146 is directly welded. Alternately, a male connector 146 could be provided at the end of each of the struts of the juncture and secured to a single enlarged clevis adapted for receipt of all of the male connectors or secured to separate clevises, all located at approximately the same point on the frame. If this alternate is utilized, the means for securing the sidecar frame to the motorcycle also comprises the means of securing the ends of the struts together to form the vertex of the tetrahedron.

Referring to FIG. 11, another manner of securing the male connector 146 to the end of a strut may be provided by means of a threaded member 160 which, in turn, is itself secured to the end of the strut. Threaded member 160 may simply comprise a threaded bolt having a head 162 secured to the end of the strut by a weld joint, or the threaded member 160 may be integrally formed with the strut or screwed into a suitably tapped hole at the end of the strut. In either event, the male connector 146 is adapted for use with threaded member 160 by providing it with an axial, internally threaded shaft to permit the male connector to be screwed onto the end of the threaded member 160.

When the type of connection shown in FIG. 11 is utilized, it may serve as a means to adjust the sidecar wheel toe-in. Toe-in refers to the slight inward set of the sidecar wheel in relation to the wheels of the motorcycle. Improper toe-in adjustment results in excessive and uneven tire wear and can contribute to handling difficulties.

Briefly, the threaded connection provides a means for adjusting the effective length of the struts which are secured thereto. Adjusting male connector 146 so that it is closer to the base or head 162 of threaded member 160 shortens the effective length of the struts secured to the male connector, and adjusting male connector 146 so that it is further away from the base of the threaded member increases the effective length of the struts. In this manner, the toe-in of the sidecar wheel may be adjusted. Additionally, the type of threaded connection shown in FIG. 11 may be utilized to facilitate connection of a single frame with struts of fixed dimensions to motorcycles of different dimensions by permitting adjustment of the effective lengths of the struts.

Another way in which the toe-in may be adjusted is illustrated in FIG. 12. As seen in FIG. 12, the use of a plate 151 in combination with a U-bolt 152 for the mounting bracket assembly permits the use of a shim 164. Shims of selected thicknesses may be placed between the motorcycle frame and plate 150 to selectively adjust the effective length of the struts secured thereto and thereby adjust the toe-in of the sidecar wheel.

Figures 5, 15:
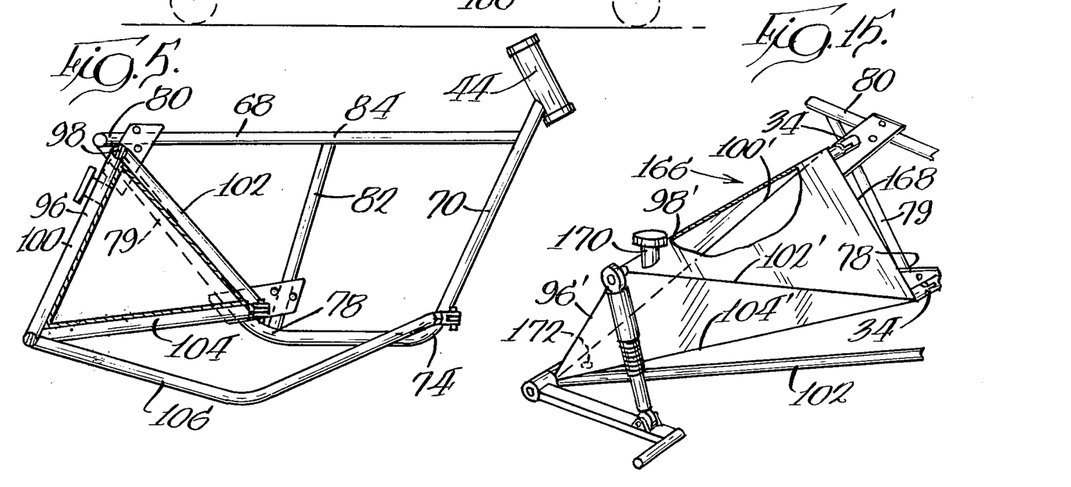
FIG. 5 is a side view of the sidecar frame secured to the motorcycle frame and illustrating the manner in which a separate auxiliary gas tank may be mounted within the tetrahedral frame.
FIG. 15 is a perspective view of an alternate embodiment of the basic tetrahedral sidecar frame of the present invention which is formed by sheet metal or other suitable sheet material and which may serve as an auxiliary gas tank or other storage space.

Turning now to FIG. 15, an alternate embodiment of the basic tetrahedral frame of the present invention, generally designated by reference numeral 166, is shown in which the struts comprise the corners of a tetrahedron having closed faces that is fabricated from a suitable sheet material, such as sheet plastic or metal, and thus may additionally serve as an auxiliary gas tank or the like. The edges or struts of the tetrahedral frame 166 are designated with the reference numeral given to the struts in the first embodiment corresponding thereto followed by a prime. These edges are interconnected with one another to form all of the vertices of the sidecar frame and they function in the same way and for the same purpose as the corresponding struts of the frame 30 of the first embodiment discussed above. Tetrahedral frame 166 is completely enclosed and thus an additional strut 168 formed by the edge of the tetrahedron extending between the vertices 78' and 80' adapted to be connected to points 78 and 80 is provided which, in the frame 30 of the first embodiment, is provided by the motorcycle frame. However, it should be understood that a sixth strut corresponding to strut 166 could of course be readily added to the first embodiment of the basic tetrahedral frame 30.

Frame 166 may be used in the same manner as frame 30. The mounting bracket assembly 34 of the same type discussed above and shown in FIGS. 8, 9, 10, 11 and 12 can be used with tetrahedral frame 166. Further, the additional frame members discussed above and shown in FIGS. 13, 14 and 6 and 7, or other additional frame members, may likewise be used in conjunction with the basic tetrahedral frame 166 in the same manner as they are used in conjunction with the basic tetrahedral frame 30. The struts 130, 132 and 134, shown in FIGS. 13 and 14, may themselves comprise the edges of a tetrahedron fabricated from sheet material in the same manner that basic frame 166 is fabricated.

The alternate embodiment of the tetrahedral frame shown in FIG. 15 defines an enclosed space between the struts of the frame formed by the edges of the tetrahedron such that the frame may be adapted by a gasoline inlet opening 170 and a gasoline outlet 172, for instance, to serve as an auxiliary gas tank or other storage space. If the space between struts 130, 132 and 134 shown in FIG. 13 were to be enclosed, it likewise could be utilized for storage. It is contemplated that frames of other designs, but which also define a three-dimensional space that can be enclosed, could advantageously be fabricated from sheet material to also form a storage area. Also, the open faces of a frame in which the struts comprise elongate cylindrical members or the like, as frame 30 of the first embodiment, could be covered with a suitable material to form a storage area.

I claim:

1. A motorcycle sidecar for connection with a motorcycle, both the sidecar and the motorcycle having two spaced apart attachment points, the sidecar including:
   two struts, one extending from each of said two spaced attachment points on the sidecar for connection to a first attachment point on the motorcycle; and
   two additional struts, one extending from each of said two spaced attachment points on the sidecar for connection to the second attachment point on the motorcycle, said four struts in combination with the sidecar and motorcycle forming the corners of a tetrahedral mounting frame, the two spaced apart attachment points on each of the motorcycle and sidecar being the vertices of the tetrahedron formed by the four struts and the motorcycle and sidecar.

2. The sidecar mounting frame of claim 1 in which said struts are rod-like elements.

3. The sidecar mounting frame of claim 1 wherein four panels of sheet material form faces of the tetrahedron, the edges of the panels being joined along four elongate corners, the four elongate corners being the struts of the tetrahedral frame.

4. The sidecar mounting frame of claim 1 wherein the attachment points on the motorcycle frame lie generally in the plane of motorcycle travel and the attachment points on the sidecar lie in a plane parallel to the plane of motorcycle travel.

5. The sidecar mounting frame of claim 4 in which the two attachment points on the motorcycle frame and on the sidecar are vertically spaced and the upper attachment points on each are substantially at the same level with the strut connected therebetween being horizontal.

6. The sidecar mounting frame of claim 5 in which the strut extending between the two upper attachment points is generally at right angles to the longitudinal plane of the motorcycle.

7. The sidecar mounting frame of claim 1 wherein a line between the two spaced apart attachment points on the motorcycle frame is transverse to a line between the two spaced apart attachment points on the sidecar.

8. The sidecar mounting frame of claim 7 in which the two spaced apart attachment points on the motorcycle frame are vertically and longitudinally spaced with the upper attachment point being rearward of the lower attachment point, and the two spaced apart attachment points on the sidecar are vertically and longitudinally spaced with the upper attachment point being forward of the lower attachment point.

9. The motorcycle sidecar frame of claim 1 wherein said motorcycle has a rear wheel with a shock assembly connected between the wheel and the motorcycle frame, the two attachment points on the motorcycle frame being vertically and longitudinally spaced, the lower forward attachment point being forward of said rear wheel and the upper rearward attachment point being adjacent the connection of said shock assembly to the motorcycle frame.

10. The motorcycle sidecar frame of claim 1 wherein said sidecar has a wheel with an axle, a swing arm extending rearwardly from the axle, a shock assembly extending up from the swing arm adjacent the axle and a strut between the rear end of the swing arm and the top of the shock assembly, the two attachment points on the sidecar being vertically and longitudinally spaced, the lower rearward attachment point being at the rearward end of said swing arm and the upper forward attachment point being at the top of said shock assembly.

11. The motorcycle sidecar frame of claim 1 wherein said motorcycle has a rear wheel with a shock assembly connected between the wheel and the motorcycle frame, the two attachment points on the motorcycle frame being vertically and longitudinally spaced, the lower forward attachment point being forward of back rear wheel and the upper rearward attachment point being adjacent the connection of said shock assembly to the motorcycle frame; said sidecar has a wheel with an axle, a swing arm extending rearwardly from the axle, a shock assembly extending up from the swing arm adjacent the axle and a strut between the rear end of the swing arm and the top of the shock assembly, the two attachment points on the sidecar being vertically and longitudinally spaced, the lower rearward attachment point being at the rearward end of said swing arm and the upper forward attachment point being at the top of said shock assembly.

12. The sidecar frame of claim 11 including a fifth strut connected from a third attachment point on the motorcycle frame forward of and at substantially the same level as the lower, forward attachment point to the rear end of the sidecar swing arm.

13. The sidecar mounting frame of claim 1 including a fifth strut connected from a third attachment point on the motorcycle frame to one of the two attachment points on the sidecar.

14. The sidecar mounting frame of claim 13 in which said fifth strut extends diagonally beneath the sidecar with the intermediate portion of said fifth strut being below a straight line between the attachment points therefor.

* * * * *